United States Patent
Wang et al.

(10) Patent No.: US 11,765,641 B2
(45) Date of Patent: *Sep. 19, 2023

(54) METHOD AND APPARATUS FOR SUPPORTING COMMUNICATION VIA A RELAY WIRELESS DEVICE

(71) Applicant: InterDigital Patent Holdings, Inc., Wilmington, DE (US)

(72) Inventors: Peter S. Wang, E. Setauket, NY (US); Janet A. Stern-Berkowitz, Little Neck, NY (US); Nobuyuki Tamaki, Melville, NY (US); Stephen E. Terry, Northport, NY (US); Mihaela C. Beluri, Jericho, NY (US); Kai Liu, Dublin, OH (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/360,668

(22) Filed: Jun. 28, 2021

(65) Prior Publication Data

US 2021/0329530 A1    Oct. 21, 2021

Related U.S. Application Data

(63) Continuation of application No. 16/572,276, filed on Sep. 16, 2019, now Pat. No. 11,076,340, which is a
(Continued)

(51) Int. Cl.
*H04W 72/12* (2023.01)
*H04W 40/22* (2009.01)
(Continued)

(52) U.S. Cl.
CPC ............ *H04W 40/22* (2013.01); *H04B 7/155* (2013.01); *H04W 16/26* (2013.01);
(Continued)

(58) Field of Classification Search
CPC ............ H04W 36/08; H04W 72/1221; H04W 72/0446; H04W 72/042; H04W 40/22;
(Continued)

(56) References Cited

U.S. PATENT DOCUMENTS 7,751,444 B2    7/2010  Chun et al.
7,821,995 B2   10/2010  Das et al.
(Continued)

FOREIGN PATENT DOCUMENTS

EP    1 296 475    3/2003
EP    2 166 810    3/2010
(Continued)

OTHER PUBLICATIONS

Ericsson et al., "Un HARQ timing alternatives," 3GPP TSG-RAN WG1 #60, R1-100864 (Feb. 22-26, 2010).
(Continued)

*Primary Examiner* — Wei Zhao
(74) *Attorney, Agent, or Firm* — VOLPE KOENIG

(57) ABSTRACT

A method and apparatus for supporting communication buffer status reports (BSRs) are disclosed. A wireless device may generate a first buffer status report (BSR) associated with first data for transmission to at least one wireless transmit/receive unit (WTRU). Also, the wireless device may generate a second BSR associated with second data for transmission to a base station. Further, the wireless device may transmit the first BSR and the second BSR in a media access control (MAC) protocol data unit (PDU) to the base station. Additionally, the wireless device may transmit the first data to the at least one WTRU. Moreover, the wireless device may transmit the second data to the base station. In a further example, the wireless device may generate the first
(Continued)

BSR and generate the second BSR are based on a priority associated with the first BSR and a priority associated with the second BSR.

20 Claims, 6 Drawing Sheets

Related U.S. Application Data continuation of application No. 15/722,720, filed on Oct. 2, 2017, now Pat. No. 10,420,010, which is a continuation of application No. 14/877,538, filed on Oct. 7, 2015, now Pat. No. 9,781,654, which is a continuation of application No. 13/075,961, filed on Mar. 30, 2011, now abandoned.

(60) Provisional application No. 61/373,555, filed on Aug. 13, 2010, provisional application No. 61/320,535, filed on Apr. 2, 2010, provisional application No. 61/320,644, filed on Apr. 2, 2010.

(51) Int. Cl.
| | | |
|---|---|---|
| *H04B 7/155* | (2006.01) | |
| *H04W 16/26* | (2009.01) | |
| *H04W 28/02* | (2009.01) | |
| *H04W 72/0446* | (2023.01) | |
| *H04W 36/08* | (2009.01) | |
| *H04W 84/04* | (2009.01) | |

(52) U.S. Cl.
CPC ... *H04W 28/0278* (2013.01); *H04W 72/0446* (2013.01); *H04W 72/1221* (2013.01); *H04W 36/08* (2013.01); *H04W 84/047* (2013.01)

(58) Field of Classification Search
CPC ............. H04W 16/26; H04W 28/0278; H04W 84/047; H04W 72/122; H04W 72/044; H04B 7/155
See application file for complete search history.

(56) References Cited

U.S. PATENT DOCUMENTS

| | | | |
|---|---|---|---|
| 8,165,594 | B2 | 4/2012 | Wang et al. |
| 8,194,577 | B2 | 6/2012 | Xie et al. |
| 8,223,642 | B2 | 7/2012 | Curry et al. |
| 8,472,379 | B2 | 6/2013 | Ishii et al. |
| 9,572,063 | B2 * | 2/2017 | Etemad ............... H04L 41/0823 |
| 2003/0139178 | A1 | 7/2003 | Uesugi et al. |
| 2004/0224709 | A1 | 11/2004 | Yi et al. |
| 2006/0176811 | A1 | 8/2006 | Yang et al. |
| 2008/0026738 | A1 | 1/2008 | Jiang |
| 2008/0132269 | A1 | 6/2008 | Shen et al. |
| 2008/0175240 | A1 | 7/2008 | Suzuki |
| 2008/0225725 | A1 | 9/2008 | Wang et al. |
| 2008/0311923 | A1 | 12/2008 | Petrovic et al. |
| 2009/0024895 | A1 * | 1/2009 | Lin ....................... H04L 1/1883 714/749 |
| 2009/0034486 | A1 | 2/2009 | Takahashi et al. |
| 2009/0113086 | A1 | 4/2009 | Wu et al. |
| 2009/0191882 | A1 | 7/2009 | Kovacs et al. |
| 2009/0196177 | A1 * | 8/2009 | Teyeb ..................... H04L 47/30 370/231 |
| 2009/0221281 | A1 | 9/2009 | Tseng |
| 2010/0103862 | A1 | 4/2010 | Ulupinar et al. |
| 2010/0254340 | A1 | 10/2010 | Park et al. |
| 2010/0279679 | A1 | 11/2010 | Young et al. |
| 2010/0302946 | A1 | 12/2010 | Yang et al. |
| 2011/0002304 | A1 | 1/2011 | Lee et al. |
| 2011/0243060 | A1 | 10/2011 | Mildh et al. |
| 2012/0236782 | A1 | 9/2012 | Bucknell et al. |
| 2013/0003650 | A1 | 1/2013 | Han et al. |
| 2013/0022083 | A1 | 1/2013 | Vasseur et al. |

FOREIGN PATENT DOCUMENTS

| | | |
|---|---|---|
| KR | 2009-0078866 | 7/2009 |
| WO | 09/088937 | 7/2009 |
| WO | 09/095814 | 8/2009 |
| WO | 09/104928 | 8/2009 |
| WO | 09/116939 | 9/2009 |
| WO | 10/135995 | 12/2010 |

OTHER PUBLICATIONS

Etri, "Consideration on MAC procedures for Un interface," 3GPP TSG RAN WG2 #66bis, R2-093751, Los Angeles, USA (Jun. 29-Jul. 3, 2009).

Hattori et al., "HSPA+/LTE/SAE Wireless Broadband," Impress, pp. 187-188, 208-209, and 214, $1^{st}$. Ed., $3^{rd}$ Printing (Dec. 11, 2010); $1^{st}$. Ed., $1^{st}$ Printing (Aug. 1, 2008).

Huawei, "RTT for HARQ on the Backhaul Link," 3GPP TSG RAN WG1 Meeting #59bis, R1-100268 (Jan. 18-22, 2010).

LG Electronics Inc., "Discussion on BSR With Relay," 3GPP TSG-RAN WG2 #69, R2-101152, San Francisco, USA (Feb. 22-26, 2010).

Motorola, "LTE signaling to support Relay operation," 3GPP TSG RAN WG1 Meeting #55, R1-084412 (Nov. 10-14, 2008).

NTT DOCOMO, "Relay Requirements & Use Case Study in LTE-Advanced," 3GPP TSG RAN WG3 Meeting #64, R3-091228 (May 4-8, 2009).

Panasonic, "Lower Layer resource usage for the deNB scheduling," 3GPP TSG-RAN WG2 Meeting #67_bis, R2-095610, Miyazaki, Japan (Oct. 12-16, 2009).

Panasonic, "Lower Layer resource usage for Un multiplexing," 3GPP TSG-RAN WG2 Meeting #68_bis, R2-100232, Valencia, Spain (Jan. 18-22, 2010).

QUALCOMM Incorporated, "Views on H-ARQ timelines for relays," 3GPP TSG-RAN WG1 #60, R1-101502 (Feb. 22-26, 2010).

Samsung, "HARQ operation in Un downlink and uplink," 3GPP TSG RAN WG1 Meeting #60, R1-101195 (Feb. 22-26, 2010).

Third Generation Partnership Project, "Technical Specification Group Radio Access Network; Evolved Universal Terrestrial Radio Access (E-UTRA); Relay architectures for E-UTRA (LTE-Advanced) (Release 9)," 3GPP TR 36.806 V2.0.0 (Feb. 2010).

Third Generation Partnership Project, "Technical Specification Group Radio Access Network; Evolved Universal Terrestrial Radio Access (E-UTRA); Relay architectures for E-UTRA (LTE-Advanced) (Release 9)," 3GPP TR 36.806 V9.0.0 (Mar. 2010).

Third Generation Partnership Project, "Technical Specification Group Radio Access Network; Evolved Universal Terrestrial Radio Access (E-UTRA); Further advancements for E-UTRA physical layer aspects (Release 9)," 3GPP TR 36.814 V9.0.0 (Mar. 2010).

Third Generation Partnership Project, "Technical Specification Group Radio Access Network; Evolved Universal Terrestrial Radio Access (E-UTRA) Medium Access Control (MAC) protocol specification (Release 8)," 3GPP TS 36.321 V8.8.0 (Dec. 2009).

Third Generation Partnership Project, "Technical Specification Group Radio Access Network; Evolved Universal Terrestrial Radio Access (E-UTRA); Medium Access Control (MAC) protocol specification (Release 8)," 3GPP TS 36.321 V8.9.0 (Jun. 2010).

Third Generation Partnership Project, "Technical Specification Group Radio Access Network; Evolved Universal Terrestrial Radio Access (E-UTRA) Medium Access Control (MAC) protocol specification (Release 9)," 3GPP TS 36.321 V9.1.0 (Dec. 2009).

Third Generation Partnership Project, "Technical Specification Group Radio Access Network; Evolved Universal Terrestrial Radio Access (E-UTRA); Medium Access Control (MAC) protocol specification (Release 9)," 3GPP TS 36.321 V9.3.0 (Jun. 2010).

Third Generation Partnership Project, "Technical Specification Group Radio Access Network; Evolved Universal Terrestrial Radio Access (E-UTRA); Medium Access Control (MAC) protocol specification (Release 10)," 3GPP TS 36.321 V10.0.0 (Dec. 2010).

(56) References Cited

OTHER PUBLICATIONS

Third Generation Partnership Project, "Technical Specification Group Radio Access Network; Evolved Universal Terrestrial Radio Access (E-UTRA); Radio Resource Control (RRC); Protocol specification (Release 10)," 3GPP TS 36.331 V10.0.0 (Dec. 2010).
Third Generation Partnership Project, "Technical Specification Group Radio Access Network; Evolved Universal Terrestrial Radio Access (E-UTRA); Radio Resource Control (RRC); Protocol specification (Release 9)," 3GPP TS 36.331 V9.6.0 (Mar. 2011).
Third Generation Partnership Project, "Technical Specification Group Radio Access Network; Evolved Universal Terrestrial Radio Access (E-UTRA) Radio Resource Control (RRC); Protocol specification (Release 9)," 3GPP TS 36.331 V9.1.0 (Dec. 2009).
Third Generation Partnership Project, "Technical Specification Group Radio Access Network; Evolved Universal Terrestrial Radio Access (E-UTRA); Radio Resource Control (RRC); Protocol specification (Release 8)," 3GPP TS 36.331 V8.13.0 (Mar. 2011).
Third Generation Partnership Project, "Technical Specification Group Radio Access Network; Evolved Universal Terrestrial Radio Access (E-UTRA) Radio Resource Control (RRC); Protocol specification (Release 8)," 3GPP TS 36.331 V8.8.0 (Dec. 2009).
Third Generation Partnership Project, "Technical Specification Group Services and System Aspects; Policy and charging control architecture (Release 11)," 3GPP TS 23.203 V11.1.0 (Mar. 2011).
Third Generation Partnership Project, "Technical Specification Group Services and System Aspects; General Packet Radio Service (GPRS) enhancements for Evolved Universal Terrestrial Radio Access Network (E-UTRAN) access (Release 10)," 3GPP TS 23.401 V10.3.0 (Mar. 2011).
Third Generation Partnership Project, "Technical Specification Group Services and System Aspects; Policy and charging control architecture (Release 7)," 3GPP TS 23.203 V7.12.0 (Dec. 2009).
Third Generation Partnership Project, "Technical Specification Group Services and System Aspects; General Packet Radio Service (GPRS) enhancements for Evolved Universal Terrestrial Radio Access Network (E-UTRAN) access (Release 9)," 3GPP TS 23.401 V9.8.0 (Mar. 2011).
Third Generation Partnership Project, "Technical Specification Group Services and System Aspects; General Packet Radio Service (GPRS) enhancements for Evolved Universal Terrestrial Radio Access Network (E-UTRAN) access (Release 9)," 3GPP TS 23.401 V9.4.0 (Mar. 2010).
Third Generation Partnership Project, "Technical Specification Group Services and System Aspects; General Packet Radio Service (GPRS) enhancements for Evolved Universal Terrestrial Radio Access Network (E-UTRAN) access (Release 8)," 3GPP TS 23.401 V8.13.0 (Mar. 2011).
Third Generation Partnership Project, "Technical Specification Group Services and System Aspects; General Packet Radio Service (GPRS) enhancements for Evolved Universal Terrestrial Radio Access Network (E-UTRAN) access (Release 8)," 3GPP TS 23.401 V8.9.0 (Mar. 2010).
Third Generation Partnership Project, "Technical Specification Group Services and System Aspects; Policy and charging control architecture (Release 8)," 3GPP TS 23.203 V8.9.0 (Mar. 2010).
Third Generation Partnership Project, "Technical Specification Group Services and System Aspects; Policy and charging control architecture (Release 8)," 3GPP TS 23.203 V8.11.0 (Sep. 2010).
Third Generation Partnership Project, "Technical Specification Group Services and System Aspects; Policy and charging control architecture (Release 9)," 3GPP TS 23.203 V9.4.0 (Mar. 2010).
Third Generation Partnership Project, "Technical Specification Group Services and System Aspects; Policy and charging control architecture (Release 9)," 3GPP TS 23.203 V9.8.0 (Mar. 2011).
Third Generation Partnership Project, "Technical Specification Group Services and System Aspects; Policy and charging control architecture (Release 10)," 3GPP TS 23.203 V10.3.0 (Mar. 2011).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.11.0 (Dec. 2009).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.12.0 (Mar. 2010).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," 3GPP TS 36.300 V9.2.0 (Dec. 2009).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," 3GPP TS 36.300 V9.7.0 (Mar. 2011).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," 3GPP TS 36.300 V10.2.0 (Dec. 2010).
Third Generation Partnership Project, "Technical Specification Group Radio Access Network; Evolved Universal Terrestrial Radio Access (E-UTRA) Medium Access Control (MAC) protocol specification (Release 8)," 3GPP TS 36.321 V8.5.0 (Mar. 2009).
Third Generation Partnership Project, "Technical Specification Group Radio Access Network; Evolved Universal Terrestrial Radio Access (E-UTRA); Services provided by the physical layer (Release 9)," 3GPP TS 36.302 V9.0.0 (Dec. 2009).
Third Generation Partnership Project, "Technical Specification Group Radio Access Network; Evolved Universal Terrestrial Radio Access (E-UTRA); Services provided by the physical layer (Release 9)," 3GPP TS 36.302 V9.3.0 (Mar. 2011).
Third Generation Partnership Project, "Technical Specification Group Radio Access Network; Evolved Universal Terrestrial Radio Access (E-UTRA); Services provided by the physical layer (Release 10)," 3GPP TS 36.302 V10.1.0 (Mar. 2011).
Third Generation Partnership Project, "Technical Specification Group Radio Access Network; Evolved Universal Terrestrial Radio Access (E-UTRA); Physical layer procedures (Release 9)," 3GPP TS 36.213 V9.1.0 (Mar. 2010).
Third Generation Partnership Project, "Technical Specification Group Radio Access Network; Evolved Universal Terrestrial Radio Access (E-UTRA); Physical layer procedures (Release 9)," 3GPP TS 36.213 V9.3.0 (Sep. 2010).
Third Generation Partnership Project, "Technical Specification Group Radio Access Network; Evolved Universal Terrestrial Radio Access (E-UTRA); Physical layer procedures (Release 10)," 3GPP TS 36.213 V10.1.0 (Mar. 2011).
Third Generation Partnership Project, "Technical Specification Group Radio Access Network; Evolved Universal Terrestrial Radio Access (E-UTRA); Multiplexing and channel coding (Release 9)," 3GPP TS 36.212 V9.1.0 (Mar. 2010).
Third Generation Partnership Project, "Technical Specification Group Radio Access Network; Evolved Universal Terrestrial Radio Access (E-UTRA); Multiplexing and channel coding (Release 9)," 3GPP TS 36.212 V9.3.0 (Sep. 2010).
Third Generation Partnership Project, "Technical Specification Group Radio Access Network; Evolved Universal Terrestrial Radio Access (E-UTRA); Multiplexing and channel coding (Release 10)," 3GPP TS 36.212 V10.1.0 (Mar. 2011).

\* cited by examiner

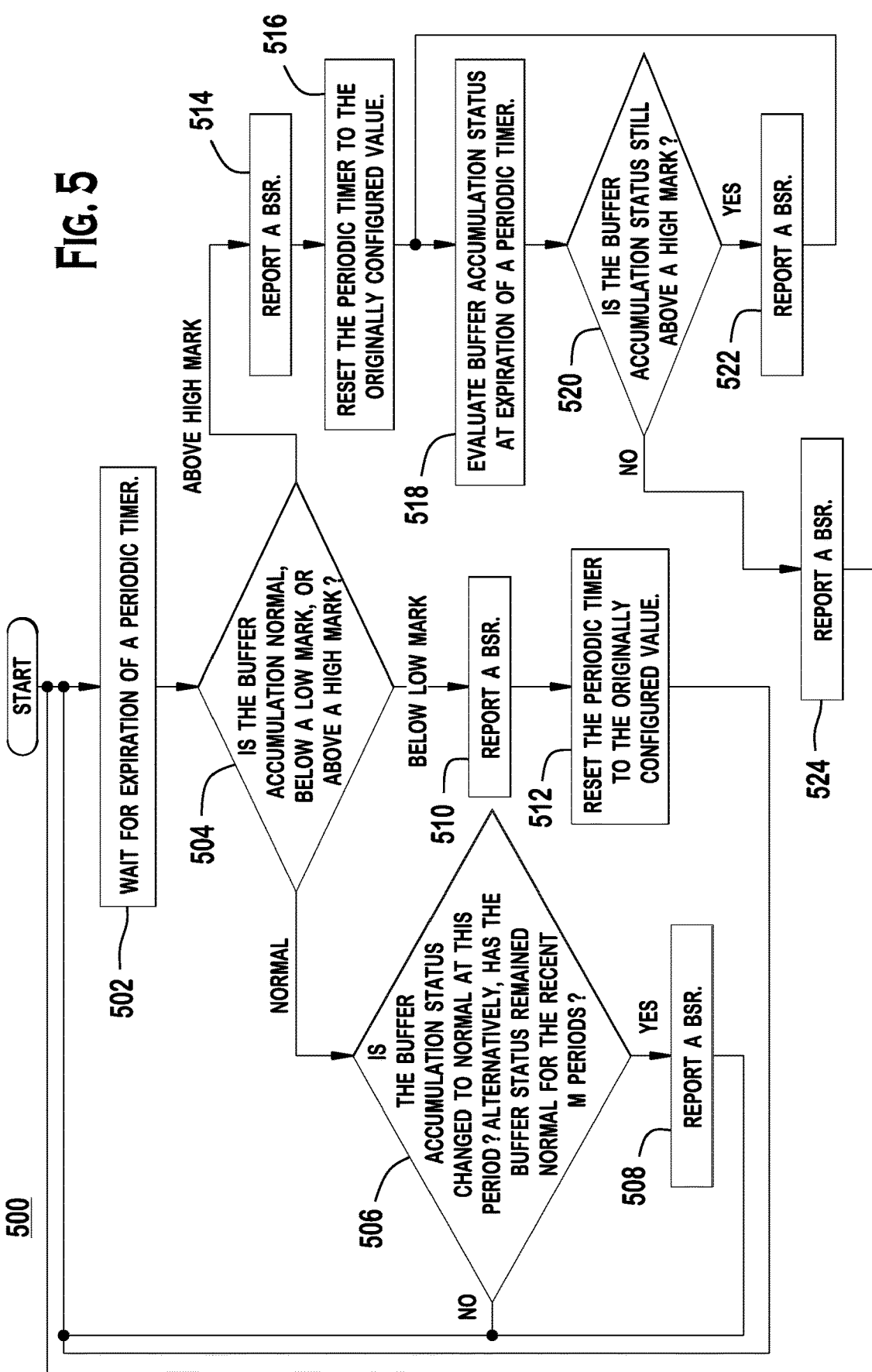

METHOD AND APPARATUS FOR SUPPORTING COMMUNICATION VIA A RELAY WIRELESS DEVICE

CROSS REFERENCE TO RELATED APPLICATIONS

This application is a continuation of U.S. patent application Ser. No. 16/572,276 filed Sep. 16, 2019, which issued as U.S. Pat. No. 11,076,340 on Jul. 27, 2021, which is a continuation of U.S. patent application Ser. No. 15/722,720 filed Oct. 2, 2017, which issued as U.S. Pat. No. 10,420,010 on Sep. 17, 2019, which is a continuation of U.S. patent application Ser. No. 14/877,538 filed Oct. 7, 2015, which issued as U.S. Pat. No. 9,781,654 on Oct. 3, 2017, which is a continuation of U.S. patent application Ser. No. 13/075,961 filed Mar. 30, 2011, which claims the benefit of U.S. Provisional Application No. 61/320,644 filed Apr. 2, 2010, U.S. Provisional Application No. 61/320,535 filed Apr. 2, 2010, and U.S. Provisional Application No. 61/373,555 filed Aug. 13, 2010, the contents of which are hereby incorporated by reference herein.

BACKGROUND

In a wireless communication system, an eNodeB (eNB) assigns air interface resources to wireless transmit/receive units (WTRUs) for the transmission and reception of data. The eNB assigns resources and the associated parameters, (e.g., modulation and coding scheme), for transmission and reception of WTRUs so that the quality of service (QoS) requirements, (e.g., delay, packet error and loss rate, etc.), associated with the data for the WTRUs are met while maintaining fairness to other WTRUs and maximizing capacity, (i.e., the number of WTRUs it can serve).

WTRUs may provide the serving eNB with a WTRU buffer status report (BSR) which tells the eNB the amount of available uplink data stored in the WTRU uplink buffers that is ready for transmission and retransmission. The BSR is used for QoS-aware packet scheduling in the evolved UMTS terrestrial radio access network (E-UTRAN).

Radio bearers (RBs) may be assigned quality of service (QoS) parameters by the network. QoS parameters define service attributes such as type of service, delay tolerance, and data error and loss tolerance. A WTRU knowing the required QoS of its RBs may make intelligent decisions on how to prioritize the RBs with respect to which data to choose to transmit when resources are assigned. The eNB may use this information to assign resources to WTRUs and prioritize transmission such that each individual WTRU performance and throughput requirements are as closely met as possible.

A QoS class identifier (QCI) may be used to define the QoS. Table 1 shows QCI characteristics including a resource type, a priority, a packet delay budget, and a packet error and loss rate. Table 2 shows a mapping of the traffic classes to the QCIs.

TABLE 1

| QCI | Resource Type | Priority | Packet Delay Budget | Packet Error Loss Rate | Example Services |
|---|---|---|---|---|---|
| 1 | GBR | 2 | 100 ms | $10^{-2}$ | Conversational voice |
| 2 | | 4 | 150 ms | $10^{-3}$ | Conversational video (live streaming) |
| 3 | | 3 | 50 ms | $10^{-3}$ | Real time gaming |
| 4 | | 5 | 300 ms | $10^{-6}$ | Non-conversational video (buffered streaming) |
| 5 | Non-GBR | 1 | 100 ms | $10^{-6}$ | IMS signalling |
| 6 | | 6 | 300 ms | $10^{-6}$ | Video (Buffered Streaming), TCP-based (e.g., www, e-mail, chat, ftp, p2p file sharing, progressive video, etc.) |
| 7 | | 7 | 100 ms | $10^{-3}$ | Voice, Video (live streaming), interactive gaming |
| 8 | | 8 | 300 ms | $10^{-6}$ | Video (buffered streaming), TCP-based (e.g., www, e-mail, chat, ftp, p2p file sharing, progressive video, etc.) |
| 9 | | 9 | | | |

TABLE 2

| QCI | Traffic Class | Traffic Handling Priority | Signalling Indication | Source Statistics Descriptor |
|---|---|---|---|---|
| 1 | Conversational | N/A | N/A | Speech |
| 2 | Conversational | N/A | N/A | Unknown |
| 3 | Conversational | N/A | N/A | Unknown |
| 4 | Streaming | N/A | N/A | Unknown |
| 5 | Interactive | 1 | Yes | N/A |
| 6 | Interactive | 1 | No | N/A |
| 7 | Interactive | 2 | No | N/A |
| 8 | Interactive | 3 | No | N/A |
| 9 | Background | N/A | N/A | N/A |

SUMMARY

A method and apparatus for supporting communication via a relay node are disclosed. A relay node may receive wireless transmit/receive unit (WTRU) buffer status reports (BSRs) from a plurality of WTRUs that are served by the relay node. The WTRU BSRs indicate uplink buffer status at the WTRUs. The relay node then may forward the WTRU BSRs to a donor evolved Node B (DeNB).

The relay node may send a relay node BSR to the DeNB. The relay node BSR indicates a relay node uplink buffer status and/or a relay node downlink buffer status at the relay node. The relay node uplink buffer status is generated based on a sum of uplink buffer accumulations for active WTRU radio bearers (RBs) of one or more WTRUs, or active WTRU RBs belonging to one or more reporting groups, and the relay node downlink buffer status is generated based on a sum of downlink buffer accumulations for active WTRU RBs of one or more WTRUs, or active WTRU RBs belonging to one or more reporting groups. The reporting groups may be organized per-WTRU or per-quality of service (QoS) associated with a WTRU DRB. The relay node BSR may be triggered either periodically, based on occurrence of a configured triggering event, or based on combination of a periodic timer and occurrence of a configured triggering event.

The relay node may send a radio resource control (RRC) message to the DeNB for requesting radio resource reconfiguration. For example, the relay node may send the RRC message to the DeNB on a condition that the handover request acknowledge message is received from the DeNB, data forwarding to the DeNB is completed, the end marker is received, and/or the WTRU context release message is received.

A method and apparatus for supporting communication BSRs are disclosed. A wireless device may transmit data to at least one group of WTRUs. The wireless device may produce a BSR, which may include an indication associated with a group of WTRUs and an indication of an amount of data that the wireless device has buffered to transmit to the group of WTRUs. The wireless device may then transmit the BSR to an eNodeB (eNB).

The BSR may include a plurality of indications associated with a respective plurality of groups of WTRUs and respective indications of amounts of data that the wireless device has buffered to transmit each of the plurality of groups. The indication of the amount of data that the wireless device has buffered to transmit to the group of WTRUs may identify a total across all logical channels of the group of WTRUs.

The wireless device may receive configuration information, including a periodic timer, from the eNB. The wireless device may then transmit BSRs for at least one group of WTRUs to the eNB based on the periodic timer.

In addition, a wireless device may transmit data to a WTRU group, which may include a WTRU and further include its own respective at least one logical channel group. The wireless device may produce a first BSR, which may include an indication associated with the logical channel group and an index indicating an amount of data for the logical channel group. Further, the wireless device may transmit the first BSR to an eNode-B.

Then, the wireless device may receive allocation information for transmission to the WTRU group. Also, the first BSR may further include a plurality of indications associated with a respective plurality of logical channel groups, and the plurality of logical channel groups may be grouped based on priority. Moreover, the first BSR may further include a plurality of indexes for the respective plurality of logical channel groups. Further, the plurality of logical channel groups may be ordered based on priority.

The index may further include a total amount of data across all logical channels of the logical channel group. Further, the wireless device may transmit a second BSR for buffered data that a wireless device intends to transmit to the eNode-B.

In addition, a wireless device may receive from an eNode-B a first indication indicating a logical channel group and at least one associated priority. The wireless device may produce a BSR associated with first data, which may include an indication associated with the logical channel group and an index indicating an amount of the first data. The wireless device may transmit the BSR to the eNode-B. Then, the wireless device may receive allocation information for transmission to a WTRU group. Further, the wireless device may transmit at least a portion of the first data to the WTRU group over a logical channel in the logical channel group.

Further, the at least one associated priority may be associated with the logical channel group. Also, the first data may be transmitted based on the at least one associated priority. Also, the BSR may further include a plurality of indications associated with a respective plurality of logical channel groups. Moreover, the first BSR may further include a plurality of indexes for the respective plurality of logical channel groups.

In another example, a wireless device may generate a first BSR associated with first data for transmission to at least one WTRU. Also, the wireless device may generate a second BSR associated with second data for transmission to a base station. Further, the wireless device may transmit the first BSR and the second BSR in a media access control (MAC) protocol data unit (PDU) to the base station. Additionally, the wireless device may transmit the first data to the at least one WTRU. Moreover, the wireless device may transmit the second data to the base station.

In a further example, the wireless device may generate the first BSR and generate the second BSR are based on a priority associated with the first BSR and a priority associated with the second BSR. In an example, the priority associated with the first BSR may be a high priority. In another example, the priority associated with the second BSR may be a high priority. In an additional example, the priority associated with the first BSR may be associated with a logical channel group. Additionally, the priority associated with the second BSR may be associated with a logical channel group.

Further, the first data may be transmitted based on the priority associated with the first BSR, in an example. Also, the second data may be transmitted based on the priority associated with the second BSR. Moreover, the first BSR may further include a plurality of indexes.

BRIEF DESCRIPTION OF THE DRAWINGS

A more detailed understanding may be had from the following description, given by way of example in conjunction with the accompanying drawings wherein:

FIG. 5 is a flow diagram of an example process of combined event-triggered and periodic BSR reporting in one embodiment.

DETAILED DESCRIPTION

Figure 1A:
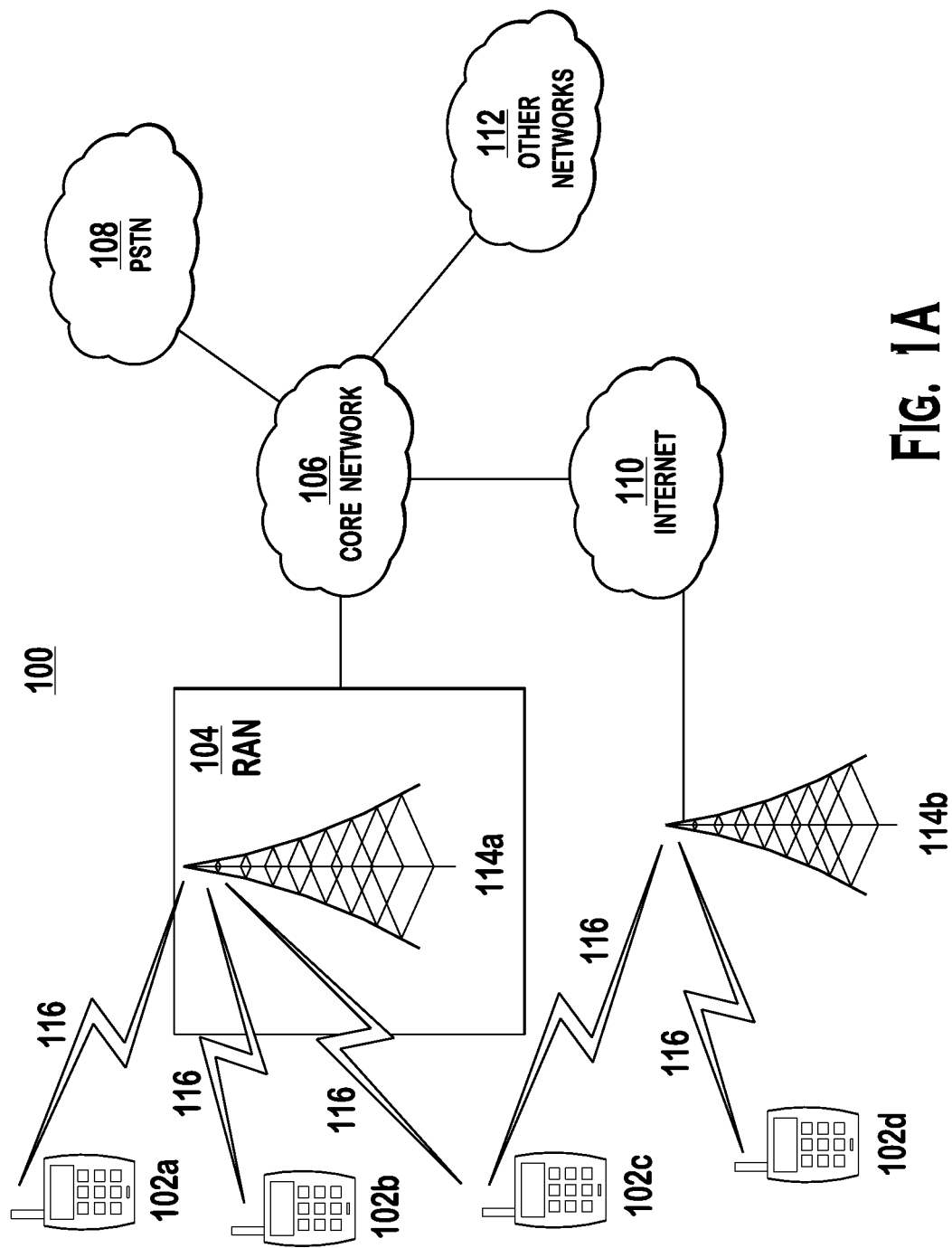
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (WTRU), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B (eNB), a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like.

For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
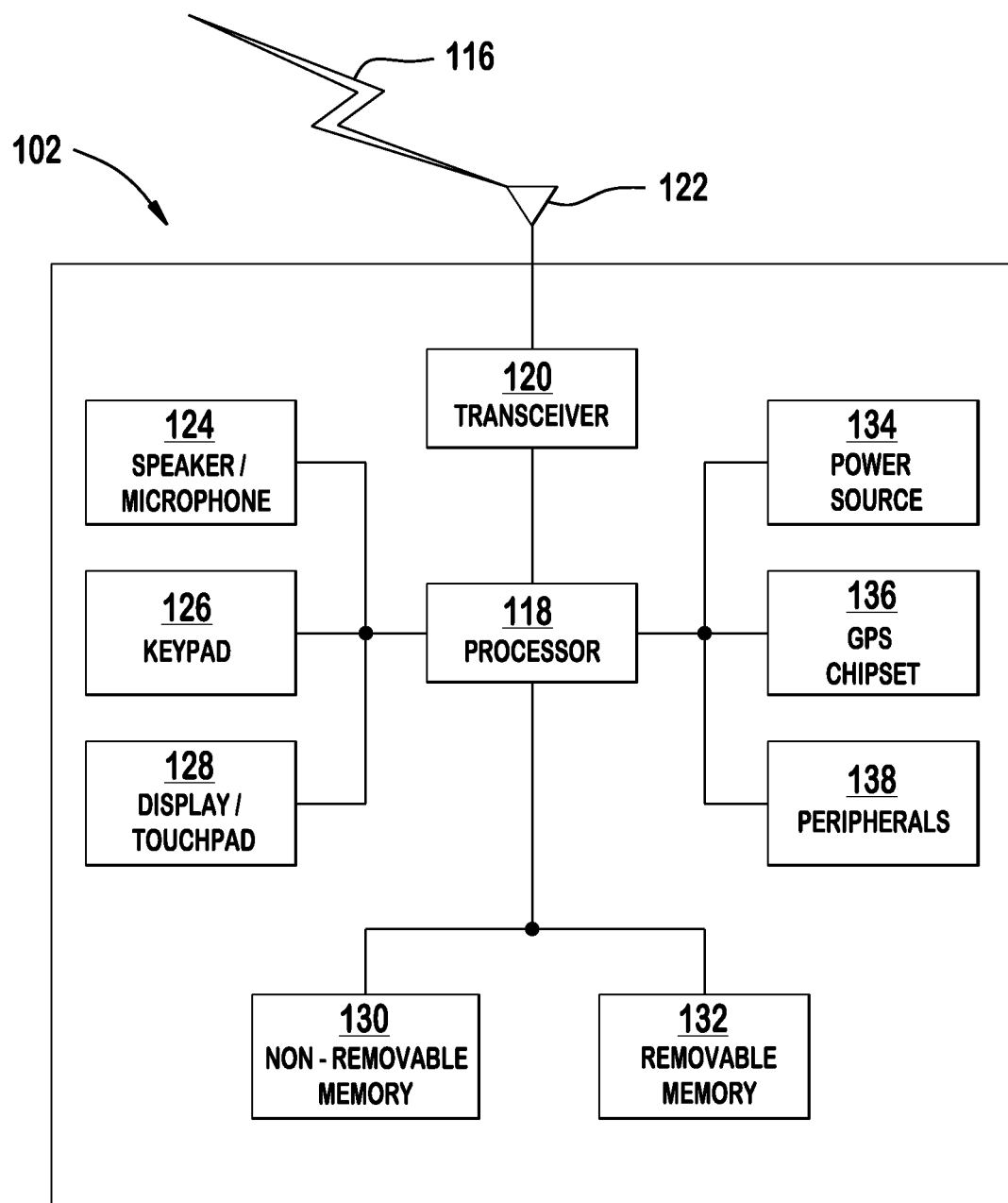
FIG. 1B is a system diagram of an example WTRU that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
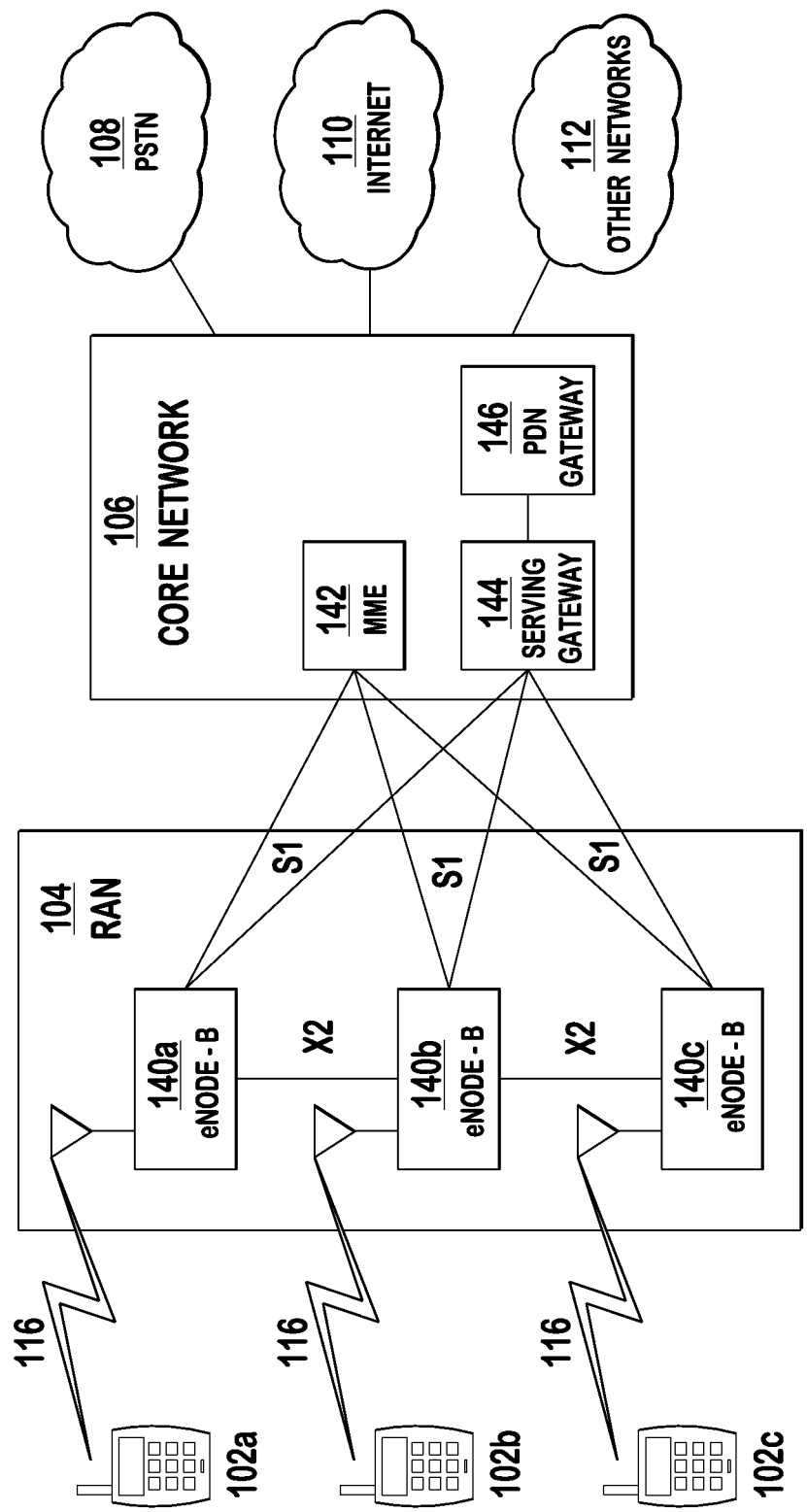
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNBs 140a, 140b, 140c may be associated with a particular cell (not shown) and may be configured to handle radio resource management decisions, handover decisions, scheduling of users in the uplink and/or downlink, and the like. As shown in FIG. 1C, the eNBs 140a, 140b, 140c may communicate with one another over an X2 interface.

The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNBs 142a, 142b, 142c in the RAN 104 via an Si interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNBs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNB handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Figure 2:
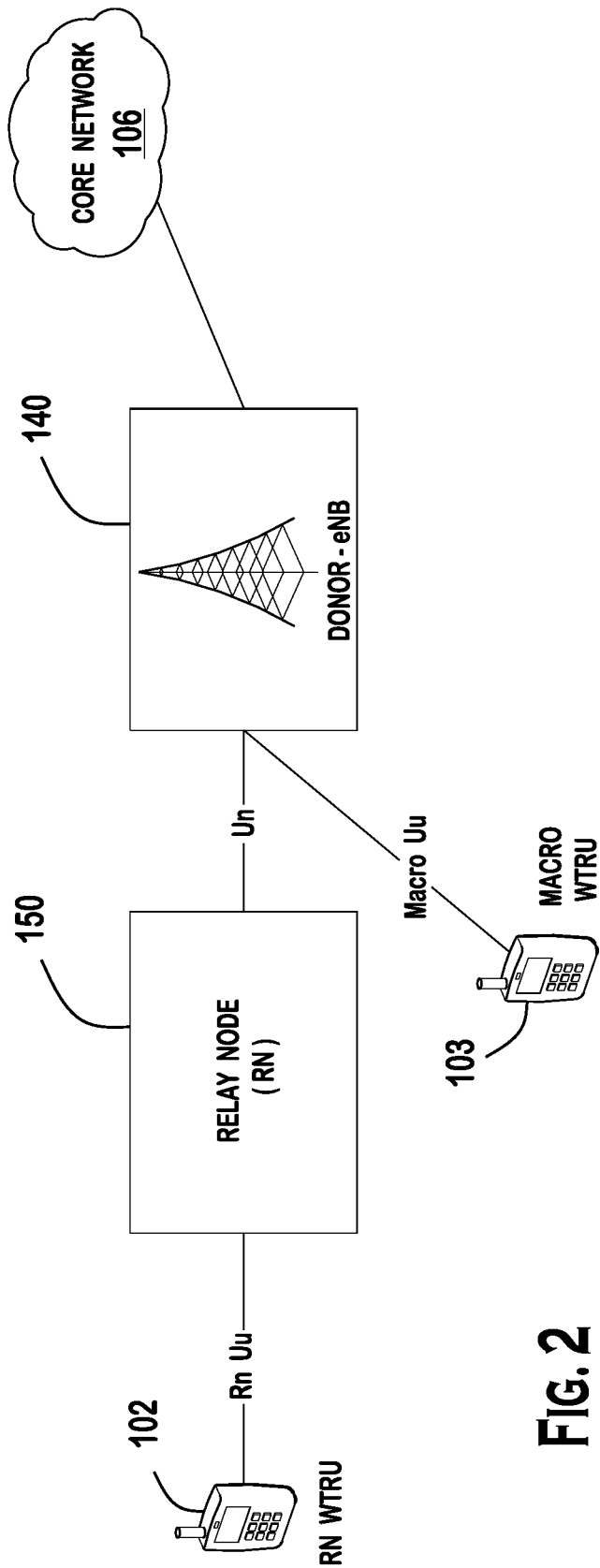
FIG. 2 shows an example system including an RN.

FIG. 2 shows an example system including WTRUs 102, 103, an eNB 140, an RN 150, and a core network 106. The RN 150 is introduced between the eNB 140 (called donor eNB (DeNB)) and the WTRU 102. The RN 150 is connected to the DeNB 140 via a wireless link. In the downlink, data is transmitted from the DeNB 140 to the RN 150, and then to the WTRU 102, and in the uplink, data is transmitted from the WTRU 102 to the RN 150 and then to the DeNB 140. The DeNB 140 provides a link to the core network 106 for the RN 150. To R8 and R9 WTRUs, the RN cell looks like a regular R8 and R9 cell under an eNB. The RN 150 is used as a tool to improve the coverage and to enhance cell-edge throughput.

An RN WTRU 102 is a WTRU that has an RN as its serving cell. A macro WTRU 103 is a WTRU that has an eNB (including DeNB) as its serving cell. A Uu interface is an air interface between the RN WTRU 102 and the RN 150 or between the macro WTRU 103 and the eNB 140. The Uu interface between the RN WTRU 102 and the RN 150 will be referred as RN Uu or simply Uu interface, and the Uu interface between the macro WTRU 103 and the eNB 140 will be referred to as a macro Uu interface. A Un interface is an air interface between the RN 150 and its DeNB 140. Hereafter, the terminologies "RN WTRU" may be referred to as "WTRU" and "RN Uu" may be referred to as "Uu" for simplicity.

A Uu RB or WTRU RB (including both DRB and SRM) is an RB configured for service to and from a WTRU 102, 103. A Un RB or RN RB (including both DRB and SRB) is an RB configured for a radio bearer over Un between the DeNB 140 and the RN 150. An RN radio network temporary identity (RNTI) is an identifier allocated by the DeNB 140 for the RN 150.

WTRU UL RB data destined for the network is transmitted by the WTRU 102 in MAC PDUs over the Uu to the RN 150 and then transmitted by the RN 150 in MAC PDUs over the Un to the DeNB 140. The DeNB 140 forwards it to the network 106. The DL transmissions occur in the reverse process.

The RN 150 may be an in-band relaying node, (called "Type 1" RN). The Type 1 RN controls cells, each of which appears to a WTRU as a separate cell distinct from the donor cell (the cell controlled by the DeNB). The RN cell may have its own physical cell ID and the RN may transmit its own synchronization channels, reference symbols, etc. In the context of single cell operation, the WTRUs may receive scheduling information and hybrid automatic repeat request (HARQ) feedback directly from the RN and send its control channels to the RN.

For the Type 1 RN, the eNB-RN link (Un) shares the same carrier frequency with the RN-WTRU links (RN Uu). Depending on the implementation of the RN, an in-band RN may or may not be able to support simultaneous transmission on its Uu link and reception on its Un link, and vice versa, due to interference of its transmission into its reception. For RNs that do not support simultaneous transmission and reception, time division multiplexing of the Un and RN Uu interfaces may be used to avoid conflict.

The DeNB configures and reconfigures radio resources for RNs at the cell level or individually for a specific RN. For example, the DeNB configures the Un subframes in the Un for the communication between the DeNB and the RN. For example, the DeNB may transmit to the RN on the Un during the periods configured as multimedia broadcast over single frequency network (MBSFN) subframes on the RN Uu link. MBSFN subframes are subframes that WTRUs understand to be reserved for multimedia broadcast multicast services (MBMS) transmissions so the WTRUs do not expect the RN to transmit data unless specifically told of MBMS transmissions in these subframes. Rather than using these subframes for MBMS, the RN may transmit and receive to and from the DeNB without having to transmit to WTRUs.

If the Un configuration does not change at the cell level, the DeNB may send a dedicated radio resource control (RRC) signaling or any equivalent signaling or message to a specific RN(s). The RRC signaling or equivalent signaling or message may specify the parameters for reconfiguration, such as a downlink Un subframe mask or a new Un subframe allocation pattern, the uplink Un subframe allocation, the subframe offset between the Un and Uu, an activation time, and the like. If the activation time is specified, the RN may maintain the current operation with the DeNB over the Un interface before the activation time, and at the activation time, the RN may receive and transmit over the Un interface in accordance with the reconfiguration.

If any Un changes result in the need for the RN to reconfigure its Uu configuration, (which may be included in the RN Uu system information block (SIB)), the RN may turn on the system information change indicator in the paging messages over the RN Uu, update the system information in the SIB as required, and publish the new system information at the SIB modification period boundary.

WTRUs may provide the RN with a WTRU BSR which indicates the amount of available uplink data stored in the WTRU uplink buffers that is ready for transmission and retransmission. The buffer status may be reported as an index into a table which provides a buffer size range. Depending on the number of logical channels having data available for transmission and the size of the padding space (in case the BSR is triggered by the MAC PDU padding), the BSR may be formatted and transmitted one of three ways: truncated BSR, short BSR, and long BSR.

A truncated BSR is a one LCG BSR which contains the buffer status of the LCG with the highest priority logical channel. The truncated LCG is used when there is more than one LCG with available data but there is not enough room in the MAC PDU to transmit a BSR for all. A short BSR is a one LCG BSR which contains the buffer status of one LCG. A short BSR is used when there is only one LCG with available data to transmit. A long BSR is a four LCG BSR which contains the buffer status of the four (4) LCGs. If there is no data for an LCG, the buffer size value for that LCG is reported as index 0.

The basic channel and bearer-related unit for the BSR is a logical channel group (LCG). An LCG includes one or more logical channels from a WTRU assigned by the eNB at the logical channel configuration. This logical channel grouping mechanism in BSR reporting is to limit the reporting load while retaining some reporting granularity. A WTRU data radio bearer (DRB) is associated with a WTRU logical channel together with a logical channel identity, a logical channel configuration, and other attributes such as an evolved packet system (EPS) identity, a radio bearer (RB) identity, packet data convergence protocol (PDCP) and radio link control (RLC) configuration information. Four LCGs (values 0-3) may be used for the WTRU bearers and logical channels. If a logical channel is not assigned to an LCG, this logical channel UL data does not need to be included in the WTRU BSR. WTRU signaling radio bearers (SRBs) are by default assigned to LCG=0.

The RN reports various types of statuses to the DeNB. For example, the RN may report buffer status and other traffic load conditions to the DeNB to support the DeNB in making resource allocations for the RN or the cell. The buffer status information may be sent via a MAC CE. Details of buffer status reporting will be explained below.

The RN may send a PDCP status PDU to reflect the Un downlink reception status of the received PDCP PDUs. The status granularity may depend on how the RN Un PDCP instances are configured. The RN Un PDCP instances may be configured for each WTRU radio bearer, or per RN DRB either per QoS-based or per WTRU-based. The PDCP status PDU may be used to report the current accumulated uplink PDCP SDUs per UL bearer in a WTRU, per UL QoS bearer, or per UL WTRU at the RN. The PDCP status reports may be useful indicators when handover of a WTRU occurs.

The RN may send an RRC message(s) to the DeNB to indicate the changing situations or conditions in the RN to trigger or assist the DeNB for adjusting the Un resource allocation or configurations that may affect the RN Uu interface configurations. The RRC message(s) may carry a report(s) of one or more measurements. The measurements may include the traffic status in the DL Uu of the RN, the buffer status, the measured aggregated data rate, link quality, (e.g., positive acknowledgement/negative acknowledgement (ACK/NACK) rate), conditions in DL Uu when resources are over or under utilized, and the like. New RRC messages or new information elements (IEs) may be defined for the reporting.

The reporting may be periodic or trigger-based. A timer(s), a threshold(s), and quantities for the reported measurements may be configured, for example, by RRC signaling. The DeNB may request an immediate report. The RN may initiate a request for reconfiguration and may include reporting values in the reconfiguration request message to support the request.

Figure 4:
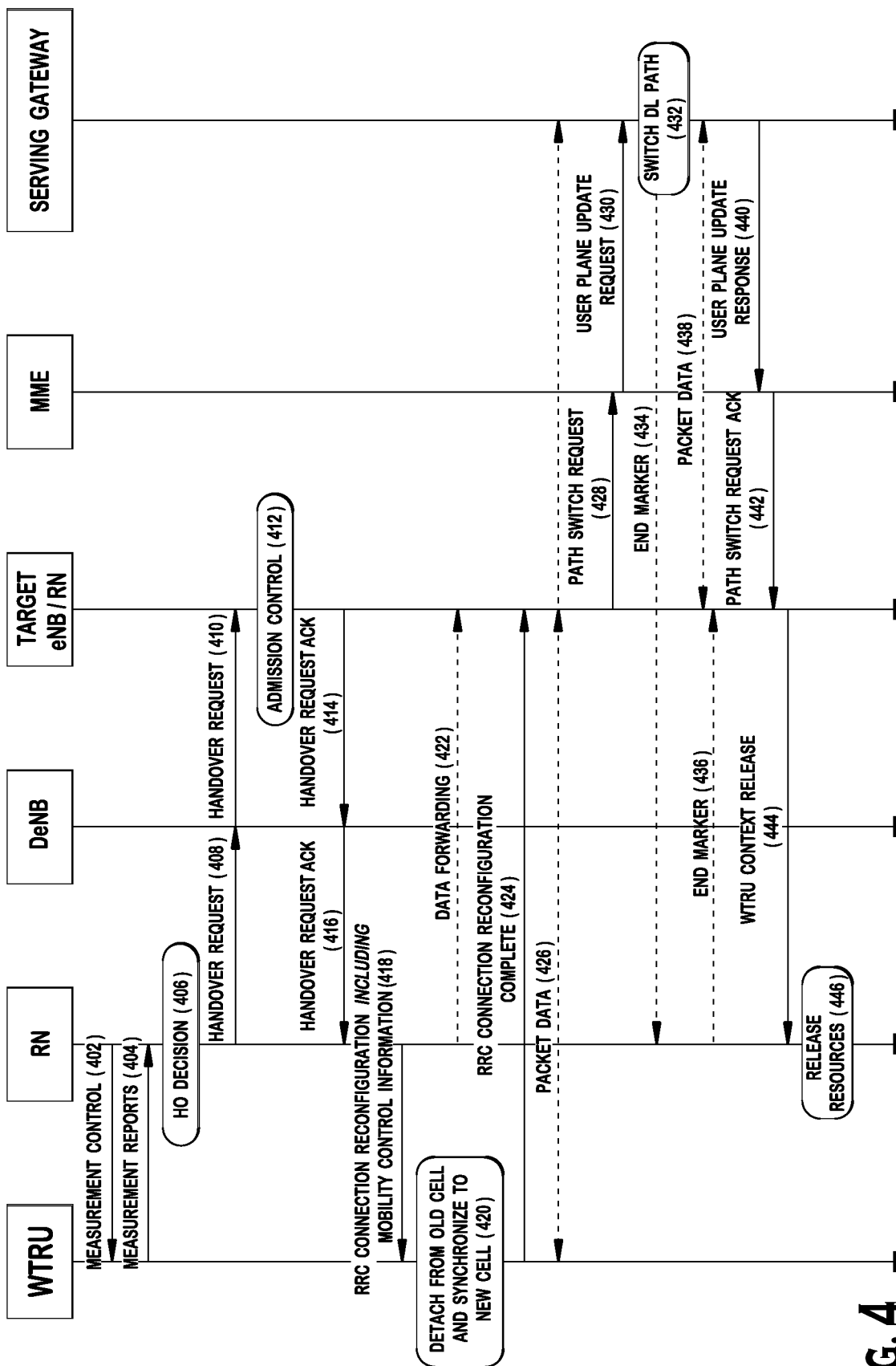
FIG. 4 is a signaling diagram of an example handover procedure.

FIG. 4 is a signaling diagram of an example handover procedure. The RN configures the WTRU measurements (402). The WTRU sends measurement reports to the RN in accordance with the configuration (404). The RN makes a handover decision based on the measurement reports (406). The RN sends a handover request to the DeNB passing necessary information to prepare the handover (408). The DeNB reads the target cell ID from the handover request message, finds the target eNB or RN corresponding to the target cell ID, and forwards the handover request message to the target eNB or RN (410).

The target eNB/RN performs an admission control (412). The target eNB/RN prepares for the handover and sends a handover request acknowledgement to the RN via the DeNB (414, 416). The handover request acknowledgement message includes a transparent container to be sent to the WTRU as an RRC message to perform the handover. The container includes a new cell radio network temporary identity (C-RNTI), target eNB security algorithm identifiers for the selected security algorithms, may include a dedicated random access channel (RACH) preamble, and the like.

The RN sends an RRC message to perform the handover, (i.e., RRC connection reconfiguration message including the mobility control information), to the WTRU (418). After receiving the RRC connection reconfiguration message, the WTRU detaches from the old cell and performs synchronization and an initial access procedure with the new cell (420). As soon as the RN receives the handover request acknowledge, or as soon as the transmission of the handover command is initiated in the downlink, data forwarding from the RN to the target eNB/RN may be initiated (422). When the WTRU has successfully accessed the target cell, the WTRU sends the RRC connection reconfiguration complete message to the target eNB/RN to confirm the handover (424). The target eNB/RN may now begin sending and receiving data to and from the WTRU and the serving gateway (426).

The target eNB/RN sends a path switch message to the mobility management entity (MME) to inform that the WTRU has changed a cell (428). The MME sends a user plane update request message to the serving gateway (430). The serving gateway switches the downlink data path to the target side (432), and sends one or more "end marker" packets on the old path to the RN and then may release any user plane/TNL resources towards the RN (434). To assist the reordering function in the target eNB/RN, the serving gateway may send one or more "end marker" packets on the old path immediately after switching the path for the WTRU. Upon receiving the "end marker" packets, the RN forwards the end marker packet to the target eNB/RN (436). On detection of the end marker, the target eNB/RN initiates any necessary processing to maintain in-sequence delivery of user data forwarded over X2 interface and user data received from the serving GW over S1 as a result of the path switch (438).

The serving gateway sends a user plane update response message to the MME (440). The MME confirms the path switch message with the path switch acknowledge message (442). By sending WTRU context release message to the RN, the target eNB/RN informs success of handover to the RN and triggers the release of resources by the RN (444). Upon reception of the WTRU context release message, the RN may release radio and C-plane related resources associated to the UE context (446).

When a WTRU is to be handed over to a different eNB or RN, the data forwarding path may be established or widened over the Un interface between the RN and the DeNB for forwarding the WTRU data existing in the RN to the DeNB and beyond. After the WTRU completes the handover, the forwarding path over the Un interface may be removed or narrowed. The RN may send an RRC indication message to the DeNB when the RN receives a handover request acknowledge message from the DeNB for a WTRU handing over from the RN to a different eNB or RN, or when the RN has received a handover request acknowledge message from the DeNB such that the resulting aggregated Un traffic now may exceed a value that is the sum of the currently configured bandwidth and a predefined or configured threshold value.

The RN may send an RRC indication message to the DeNB when the RN finishes forwarding the data for the concerned WTRU to the DeNB, when the RN receives an end marker message or similar indication from the network, or when the RN receives the WTRU context release message from the network.

To reduce the signaling load and the Un reconfiguration processing burden, the RN may send the RRC indication message for the WTRU handover if the forwarding path bandwidth to be added or removed is significantly impacting the Un capability configured for the RN over a predefined or configured threshold. The threshold may be configured as a data byte count or a percentage with respect to the total bandwidth for the RN over the Un interface.

When the RN experiences a certain amount of data backlog or certain amount of data underflow in the Un uplink for a certain period of time or when the aggregated WTRU UL data backlog, (e.g., detected from the WTRU BSRs), is over a threshold or below a threshold, the RN may send an RRC indication message to the DeNB to request for Un resource reconfiguration.

Parameters for a data volume change figure (V) and/or a time figure (T) may be defined for such reporting. The parameter T may be used as the minimum time a data backlog or underflow or a bandwidth volume change amount may be above or below a threshold before the RRC indication message may be sent. The parameter T may be used as the minimum interval between the DeNB's last Un (re) configuration message, (e.g., RRC ConnectionReconfiguration), and the new RRC indication message. The parameter V may be used as the threshold for the data backlog/underflow or for the bandwidth requirement change amount threshold.

In addition to providing WTRUs with the normal voice and data services, the RN may provide other user applications and services to the WTRUs. The setup or reconfiguration of these applications may involve the DeNB unlike regular radio bearer handling and, as a result, the DeNB may know that the Un interface may be reconfigured. In this case, the RN may indicate the resource requirements to the DeNB. For example, in case where the RN provides multimedia broadcast multicast services (MBMS) services to the WTRUs, the RN (when activating or deactivating certain MBMS services) may indicate to the DeNB a request for downlink Uu subframe reconfiguration and/or for Un bandwidth and subframe configuration changes by sending an RRC indication message when the RN-cell MBMS service(s) start and stop, or configurations change.

The RN may send an RRC indication message to the DeNB for other applications that may change the Uu/Un configuration or bandwidth requirement and that the DeNB is not involved with their start, stop, and/or changes. The RN may send an RRC indication message to the DeNB when the WTRU application changes QoS requirements, (e.g., a normal QoS requirement has changed to require low jitter or low delay such that it cannot be guaranteed by the current Un subframe allocation).

Both the RN and the DeNB monitor the channel quality. In the Un uplink the DeNB may learn the RN transmission quality by the hybrid automatic repeat request (HARQ) reception and the DeNB may learn its Rn downlink transmission quality by the RN's feedback of the channel quality indicator (CQI), rank indicator (RI), or precoling matrix indicator (PMI). The DeNB may adjust the related Un parameters without additional information from the RN.

The DeNB by itself does not know the RN-Uu link quality. For an inband Type1 Relay, if there are many WTRUs over an unstable RN-Uu interface, the allocation of the RN-Uu configuration may be adjusted. This adjustment of RN-Uu configuration may affect the Un configuration. In this case, the RN may transmit an RRC indication message requesting some RN-Uu configuration change if that change affects the configuration on the Un interface.

When some of the system information parameter values change, the RN operation over the Un and/or Uu may also change. In this case, the DeNB may adjust some of the Un operating parameters or RN settings. If the DeNB does not reconfigure the Un, the RN may send an RRC indication message to the DeNB to request such reconfiguration. For example, this may happen when a change occurs on the following DeNB system information parameters: downlink bandwidth change which affects the RN usage of the Un frequency resource, maximum transmit power limit change which affects the WTRU power headroom, uplink bandwidth and/or uplink carrier frequency change which affects the RN uplink operation, MBSFN subframe configuration list which affects the Un subframe allocation.

When the RN transitions from the connected state to the idle state, the RN may notify the DeNB by an RRC indication message on its intended detach, release or shutdown action so that the DeNB may release the Un resource allocated to the RN as well as other connections the RN has with various network nodes. The RN may leave the connected state when the RN is shutdown by the local operation, administration, and maintenance (OAM), (e.g., when the RN receives the DETACH-ACCEPT or the signaling-connection-release message from the core network), when the RN is detached or is ordered to disconnect by the core network mobility management entity (MME), (e.g., when the RN has replied to the network with the DETACH-ACCEPT message), or when the RN has operational problems, (e.g., the RN detects security violations or unrecoverable error conditions over ciphering or integrity protection).

In case where the RN has a lot of WTRUs connected and the Uu interface resource is either limited or the radio link quality is low, the UL data may be accumulated at the WTRU side and the Uu DL data may be buffered at the RN side. The DeNB may not know the data accumulation status of WTRU UL buffer and RN DL buffer. In one embodiment, the RN may send an indication to the DeNB when the total WTRU UL buffer exceeds a threshold (detected from the WTRU BSRs reported to the RN), or the total RN DL buffer exceeds a threshold, to indicate to the DeNB that the Un interface needs to be reconfigured to leave more resource to the Uu interface. The RN may send an RRC indication message to the DeNB when the RN wants to adjust the Uu interface configurations.

The RRC indication message may include a cause indicating the purpose of the RRC indication message. The cause may be Un or Uu resources related, such as a resource addition request for Un or Uu, a resource reduction request for Un or Uu, a resource release request, and the like. The RRC indication message may include other cause or sub-cause including MBMS resource reconfiguration, handover resource reconfiguration. The RRC indication message may include an uplink bandwidth request (addition or reduction), and an amount indication, the uplink Uu subframe change request, (e.g., add, reduce, shift), and/or the uplink power change request.

In the embodiments above, use of an RRC indication message is an example and alternatively any other message(s) or information elements in new or existing message(s) may be used.

Embodiments for reporting BSRs are disclosed hereafter.

In one embodiment, the RN may generate buffer status reports (BSRs) for the RN DRBs, and send the reports to the DeNB. An RN receives UL RBs from the WTRUs, and maps them to the UL RN DRBs. The uplink data accumulated in the RN uplink buffers may be organized and reported to the DeNB as the RN BSR contents. The buffer status report may include an actual count of data, (e.g., byte count), and/or a value (such as an index into a look up table) representing that count of data, and/or a value representing a range in which the count falls. Other traffic volume related information may also be reported as an independent item or be reported in association with the byte count or equivalent.

The RN uplink buffers may be organized based on how the WTRU RBs are mapped to the RN DRBs. The RN DRB may be organized per WTRU such that the RBs of a WTRU map to one RN DRB (RBs of multiple WTRUs may map to one RN DRB). Alternatively, the RN DRB may be organized per QoS such that the RBs of all or a subset of WTRUs with a given QoS map to one RN DRB (multiple QoSes may map to one RN DRB). Alternatively, the RN DRB may be organized per RN such that the WTRU DRBs are mapped to a single RN DRB.

The RN BSR may include a buffer status of a single RN DRB. The RN BSR may include the sum (or an indication of the sum or range) of the uplink buffer accumulation of the active WTRU RBs which are mapped to one RN DRB. The RN DRB may be identified by an RN DRB ID (or equivalent).

Alternatively, the RN BSR may include a buffer status of a single RN DRB reporting group. The RN BSR may include the sum (or an indication of the sum or range) of the uplink buffer accumulation of the active WTRU RBs which are mapped to one or more RN DRBs that belong to one RN DRB reporting group. The RN DRB reporting-group may be identified by an RN DRB reporting group ID (or equivalent).

Alternatively, the RN BSR may include buffer statuses of multiple RN DRB reporting groups. Each buffer status is the sum (or an indication of the sum or range) of the uplink buffer accumulation of the active WTRU RBs which are mapped to one or more RN DRBs that belong to one RN DRB reporting group. The report may include an RN DRB reporting group ID (or equivalent) for each RN DRB reporting group in the report. Alternatively, the report may include the buffer status for each of the RN DRB reporting groups in a predetermined order, (e.g., the order may be signaled to the RN or may be fixed by the standard), such that the RN DRB reporting group IDs may be omitted. If there are a set of predetermined orders, (e.g., based on signaling to the RN or defined by the standard), the report may use one of those orders and indicate in the report which one is used, and the reporting group IDs may be omitted.

Alternatively, the RN BSR may include a combination of buffer status for one or more individual RN DRBs, the individual buffer status of one or more RN DRB reporting groups, and/or the sum of the buffer statuses from one or more RN DRB reporting groups.

In case where the RN DRBs are organized per WTRU, the RN BSR may include a sum (or an indication of the sum or range) of the uplink buffer accumulation of the active RBs from the one WTRU, which are mapped to one RN-DRB.

Alternatively, the RN BSR may include a sum (or an indication of the sum or range) of the uplink buffer accumulation of the active RBs from one or more WTRUs that are mapped to one or more RN DRBs that belong to a reporting-WTRU-group. In this case, the RN DRBs and/or the associated WTRU RBs are assigned with the same reporting-WTRU-group-identifier.

Alternatively, the RN BSR may include the buffer statuses for several reporting-WTRU-groups (with one buffer status per reporting-WTRU-group) where each buffer status is the sum (or an indication of the sum or range) of the uplink buffer accumulation of the active RBs from one or more RN WTRUs that are mapped to one or more RN DRBs that belong to a reporting-WTRU-group. The report may include a reporting-WTRU-group-identifier (or equivalent) for each reporting-WTRU-group in the report. Alternatively, the report may include the buffer status for each of the reporting-WTRU-groups in a predetermined order, (e.g., the order signaled to the RN or configured by the standard), such that the reporting-WTRU-group-identifiers may be omitted. Alternatively, if there are a set of predetermined orders (e.g., based on signaling to the RN or defined by the standard), the report may use one of those orders and indicate in the report which is used, and the reporting-WTRU-group-identifiers may be omitted.

Alternatively, the RN BSR may include a combination of buffer status for one or more individual RN DRBs and/or the individual buffer status of one or more reporting-WTRU-groups and/or the sum of the buffer statuses from one or more rep rting-WTRU-groups.

In case where the RN DRBs are organized per-QoS, (e.g., by DRB priority or QCI value), the RN BSR may include a sum (or an indication of the sum or range) of the uplink buffer accumulation of the active WTRU RBs with the one or more QoS which are mapped to one RN-DRB.

Alternatively, the RN BSR may include a sum (or an indication of the sum or range) of the uplink buffer accumulation of the active WTRU RBs with the one or more QoS that are mapped to one or more RN-DRBs that belong to a reporting-QoS-group. The RN DRBs and/or the associated WTRU RBs may be assigned with the same reporting-QoS-group-identifier.

Alternatively, the RN BSR may include the buffer status for each of several reporting-QoS-groups (with one buffer status per reporting-QoS-group) where each buffer status is the sum (or an indication of the sum or range) of the uplink buffer accumulation of the active WTRU RBs with the one or more QoS that are mapped to one or more RN DRBs that belong to a reporting-QoS-group. The report may include a reporting-QoS-group -identifier (or equivalent) for each reporting-QoS-group in the report. Alternatively, the report may include the buffer status for each of the reporting-QoS-groups in a predetermined order, (e.g., the order may be signaled to the RN or may be fixed by the standard), such that the reporting-QoS-group-identifiers may be omitted. Alternatively, if there are a set of predetermined orders, (e.g., based on signaling to the RN or defined by the standard), the report may use one of those orders and indicate in the report which is used, and the reporting-QoS-group-identifiers may be omitted.

Alternatively, the RN BSR may include a combination of buffer status for one or more individual RN DRBs and/or the individual buffer status of one or more reporting-QoS-groups and/or the sum of the buffer statuses from one or more reporting-QoS-groups.

The uplink buffer status may be included in the RN BSR alone or together with other aspects of buffer or traffic related status.

In another embodiment, the RN may report RN downlink buffer status to the DeNB. Downlink data buffered in the RN may be reported to the DeNB to support DeNB management of radio resources. For certain types of relays, (e.g., half-duplex type 1 relays operating the Uu and Un interfaces in the same frequency band), transmitting on the Un causes interference to reception on the Uu, and vice versa. In such case, resources on the Uu and Un may be allocated to reduce such interference. If the DeNB understands the needs of the Relay Uu, the DeNB may take that into account it when allocating resources on the Un.

The DL buffer status in the RN may indicate an overflow or underflow situation. The report may include a cause, (e.g., shortage of Uu bandwidth or Uu transmission issues). The DL status report may indicate an overflow with a high Uu transmission NACK rate. This may indicate the downlink transmission is operating under bad interference or under poor radio coverage and that a flow control towards the WTRU radio bearer may be exercised on the DeNB, on the RN, or both. The DL status report may indicate an overflow with a low Uu transmission NACK rate. This may indicate a Uu resource scheduling problem or Uu bandwidth shortage problem. The DeNB may use this information to adjust the Un configuration for the RN which may enable the RN to configure and/or use more DL Uu resources. The DL status report may indicate an underflow with a low Uu transmission NACK rate. This may indicate over resource scheduling or DL Uu bandwidth over allocation. The DeNB may use this information to adjust the Un configuration for the RN, for example to reduce the allocation to the Un for this RN and use the resources for other RNs or macro WTRUs.

The RN downlink data buffer status may be included in the RN BSR or in another RN report to the DeNB such as a Un subframe configuration report.

The RN DL buffer status may include total downlink buffered data (including control plane and/or user plane data) in the RN. The RN DL buffer status may include a sum of the downlink buffer accumulations for the active WTRU RBs of one or more WTRUs, or the active WTRU RBs belonging to one or more reporting-WTRU-groups. The grouping of the WTRUs into the downlink reporting-WTRU-groups may be the same as in the uplink reporting-WTRU-groups, or it may be assigned differently. The RN DL buffer status may include a sum (or indication of a sum or range) of the downlink buffer accumulations for the active WTRU RBs related to one or more QoS data streams, or the active WTRU RBs related to one or more reporting-QoS-groups. The downlink reporting-QoS-grouping configuration may be the same as in the uplink reporting-QoS-group, or it may be assigned differently. The RN DL buffer status may include any combination of the above.

The downlink buffer status may indicate an actual count (e.g., byte count), a value (such as an index in a look up table) representing that count, or a value representing a range in which the count falls.

The RN DL buffer status may be transmitted in one or more of the following embodiments. The RN downlink buffer status report may be transmitted together with the RN uplink buffer status report. The RN DL buffer status may be reported alone when explicitly configured, when there is no uplink data buffered, when the status of the buffered uplink data is not triggering a BSR, (e.g., based on thresholds). The RN downlink buffer status may be transmitted on a periodic basis, or in response to an explicit request from the DeNB. In case, the BSR is reported via a MAC CE, the MAC BSR CE may be identified by the logical channel identity (LCID) in the MAC header. When the downlink buffer status is reported either alone or together with the uplink BSR, a new LCID or equivalent may be used for the DL BSR or the mixed UL/DL BSR report. The LCID in the MAC CE for downlink buffer status report may be defined similarly as the uplink BSR LCID.

The DL BSR reporting may be triggered based on the comparison of the RN Uu DL buffer accumulation with the RN Un DL buffer accumulation. If the RN Un DL buffer accumulation is larger than or smaller than the RN Uu DL buffer accumulation by a threshold value (configured or predetermined), a DL RN BSR reporting may be triggered.

Figure 3:
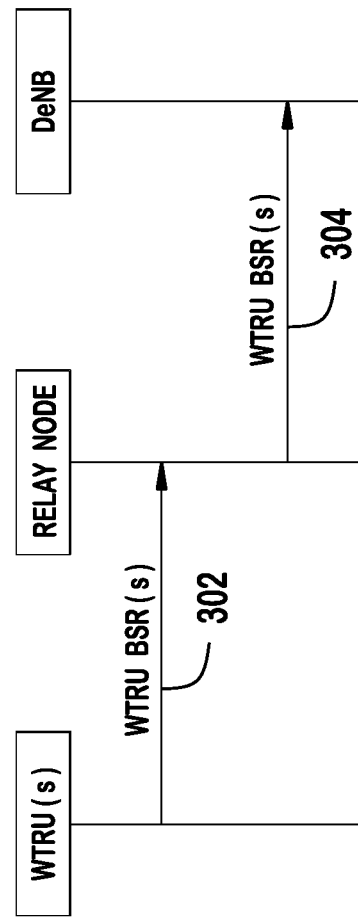
FIG. 3 shows reporting WTRU BSRs to the donor eNB (DeNB)

In another embodiment, the RN may report WTRU buffer status reports to the DeNB. FIG. 3 shows reporting WTRU BSRs to the DeNB. An RN receives WTRU BSRs from a plurality of WTRUs that are served by the RN (302). The WTRU BSRs indicate uplink buffer status at the WTRUs, which reflects the uplink data accumulation for the RN Uu interface. The RN then forwards the WTRU BSRs to the DeNB (304).

This information may be used to support DeNB management of radio resources. For certain types of relays (e.g., half-duplex type 1 relays operating the Uu and Un interfaces in the same frequency band) transmitting on the Un causes interference to reception on the Uu, and vice versa. In such case, resources on the Uu and Un may be allocated to reduce such interference. If the DeNB understands the needs of the RN Uu, the DeNB may take it into account when allocating resources on the Un.

The WTRU BSRs may be relayed to the DeNB in the basic unit of RN WTRUs. The RN may sum the LCG loads of a WTRU. Other information such as the current Uu UL resource allocation status or the allocated subframes together with the Uu UL NACK rate may also be provided by the RN to the DeNB to, for example, serve as the indications for the Uu link transmission and Uu UL bandwidth allocation conditions.

The RN may report to the DeNB for each WTRU the buffer overflow with a high NACK rate, which may indicate poor transmission conditions, the buffer overflow with a low NACK rate, which may indicate Uu bandwidth restriction if RN determines that, the buffer underflow with a low NACK rate, which may indicate the Uu bandwidth over allocation. These indications may be derived by the RN from the individual WTRU BSRs and other information. These indications may be transmitted to the DeNB, either as part of the RN BSR, or in a special report to DeNB, (e.g., one for Un reconfiguration).

Reports of WTRU BSRs may be grouped in one or more of the following ways. BSRs of the WTRUs that report BSR may be summed. Alternatively, BSRs of a specific set of WTRUs may be summed. Alternatively, WTRU BSR may be reported individually. Alternatively, BSRs on a specific LCG value (e.g., LCG=0) from the WTRUs reporting BSR may be aggregated. Alternatively, BSRs on each of the four LCGs may be aggregated, respectively, resulting total four from the WTRUs reporting BSR. When grouping the WTRU BSRs and reporting an aggregated BSR for a group, the number of WTRUs in that group may be reported.

The reported buffer status in each case may be an actual count, (e.g., byte count), a value (such as an index in a look up table) representing that count, or a value representing a range in which the count falls.

The RN may include the individual and/or aggregated WTRU BSRs in the RN BSR separately or together with other buffer status report contents, or they may be in a separate report. When reporting the WTRU BSRs to the DeNB, the RN may include the Uu subframe configurations to the DeNB.

In another embodiment, the RN may include in the RN BSR (or in another report) a satisfaction indicator which indicates whether the RN is satisfied or not with its resource allocation with respect to the current traffic load and its transmission and reception operations. The satisfaction indicator may indicate the degree of satisfaction.

When determining the satisfaction indicator value, the RN may take into account the Un uplink resources and traffic load (e.g., Un uplink resource allocated vs. the uplink load, for example, as indicated by RN UL BS, RN Un uplink power head room, RN transmission NACK rate), the Un downlink transmission and load, (e.g., RN Un downlink reception NACK rate and/or RN CQI detection conditions), the Uu uplink resource and load (e.g., RN WTRU BSRs, RN WTRU power headroom reports (PHRs), RN WTRU SRS measurements, RN Uu resource allocation), or the Uu downlink resource, load and transmission (RN DL buffer status, RN DL transmission NACK rate, RN WTRU-CQI reports), and the like.

The satisfaction indicator may be included in the RN BSR or other reports, and may be sent regularly or when it is specifically requested by the DeNB. The satisfaction indicator may be a single bit or multiple bits. The satisfaction indicator may be defined as a table on the conditions/status with some or all of the above discussed parameters or more. The indicator may be an index value into a satisfaction indicator table. There may be more than one satisfaction indicator to indicate the satisfaction status related to different sets of criteria.

Embodiments for grouping RN BSR reports are disclosed hereafter. As disclosed above, the RN DRBs may be grouped into a plurality of reporting groups and the buffer accumulation status of each reporting group may be reported to the DeNB. The BSR reports may be grouped per-QoS and per-WTRU.

If the RN DRBs are organized per-QoS, a reporting-QoS-group-ID may be assigned to each RN DRB, for example, at the RN DRB establishment via dedicated signaling by the DeNB. If the RN DRBs are organized per-WTRU, a reporting-WTRU-group-ID may be assigned to each RN DRB, for example, at the RN DRB establishment via dedicated signaling by the DeNB. The assignment of an RN DRB to a reporting group may be re-assigned or revoked. An RN DRB with a revoked reporting group ID may be treated as if it had not been assigned a reporting-group-ID.

An RN DRB may not be assigned to a reporting group. In this case, the RN may report the RN DRB BSR alone, or may report it with other assigned reporting group(s) BSRs. Individual RN DRB BSR reporting may be triggered independently.

In one embodiment, the RN-DRBs are organized based on QoS, and the RN DRBs may be assigned to a reporting-QoS-group based on the QoS requirements of the RN DRB. For example, the QoS may be defined based on a QCI or a traffic class. The RN DRBs may be grouped into a reporting-QoS-group based on the traffic class. In this case, the reporting-QoS-groups may correspond to the conversational, streaming, interactive and background traffic classes. The RN DRBs may be assigned to reporting-QoS-groups based on these characteristics.

Alternatively, the RN DRBs may be grouped based on a QCI. In this case, up to nine reporting-QoS-groups may be defined. Some QCIs may be combined together, such as QCI 8 and QCI 9. RN DRBs with the same QCI value (or values if some are combined into one group) may be assigned to a predetermined reporting-QoS-group.

Alternatively, the RN DRBs may be grouped based on a QCI per their resource type. In this case, RN DRBs with the QCI QoS values corresponding to the resource type guaranteed bit rate (GBR) may be assigned to one reporting-QoS-group, and the RN DRBs with QCI values corresponding to the resource type non-GBR may be assigned to another reporting-QoS-group.

Alternatively, the RN DRBs may be grouped based on a QCI per their packet delay budget or per their packet error or loss rate, or by a combination of some of them with the resource type and priority. For example, the RN DRBs may be grouped based on the attributes of the QCI resource type and their delay budget, wherein the example grouping may be: resource type GBR with delay budget 150 ms or below, resource type GBR with delay budget 300 ms, resource type non-GBR with delay budget 100 ms, and resource type non-GBR with delay budget 300 ms. In another example, the RN DRBs may be grouped based on the resource type GBR with different packet error or loss rates, or based on resource type Non-GBR with different delay budgets.

Alternatively, the RN DRBs may be grouped based on the allocation and retention priority (ARP) characteristics, (i.e., the ARP-priority, the ARP-pre-emption capability, or the ARP-pre-emption vulnerability, individually or a combination of some or all of them).

Alternatively, the RN DRBs may be grouped based on their QCI characteristics together with their ARP characteristics with different combinations. For example, the resource type GBR with ARP-pre-emption capability="yes" and the ARP-pre-emption vulnerability="no" as one reporting group, the resource type GBR with ARP-pre-emption capability="no" and the ARP-pre-emption vulnerability="no" as another reporting group, and the rest with their different delay budgets as another group.

Alternatively, the RN DRBs may be grouped based on their QoS parameters as defined by the priority value assigned to the logical channel. The priority value is used by logical channel prioritization in the MAC layer.

When the RN BSR is triggered, the RN may sum the available data in buffers (uplink, or uplink+downlink) assigned to a reporting group(s) and format the BSR record with the assigned reporting group ID and the total data buffered (for one group or each group) in actual or converted size indication. The converted size indication may be a value (such as an index into a look-up table) representing the buffer size or range in which the buffer size falls.

In another embodiment, the RN DRBs are organized per WTRU, and the RN DRBs may be assigned to a reporting-WTRU-group based on the characteristics of the WTRU (or WTRUs) mapped to it. The RN DRBs may be grouped into a reporting-WTRU-group based on the WTRUs' current QoS category ($Q_{UE}$).

In one embodiment, the WTRU current QoS category $Q_{UE}$ may be determined by the data radio bearer of the highest required or prioritized QoS on the WTRU, (i.e., $Q_{UE}$=the highest $Q_{val}$ of the WTRU RBs). $Q_{val}$ is a numerical value reflected or redefined from the data radio bearer's QoS assignment or association by the network. The $Q_{val}$ may be the QCI value of the QCI table or the priority value of the QCI table, or may be defined as the aggregation of these and other factors in the table in consideration of the RN operating characteristics. The $Q_{val}$ and the $Q_{UE}$ are numeric values such that the smaller the $Q_{val}$ or the $Q_{UE}$ value the higher the QoS requirement or priority it may imply. For example, if the WTRU currently has three data radio bearers active, (i.e., not suspended), and they are assigned or associated with a QCI value by the network as its QoS assignment/classification, hence having the $Q_{val}$ values of 2, 4, and 7, the WTRU current QoS category may be 2. In this embodiment, the highest prioritized WTRU DRB (and therefore the WTRU or the RN DRB) reporting activity on the RN may be recognized and somehow biased and the subsequent resource scheduling effort by the DeNB with respect to the highest prioritized WTRU-DRB and the WTRU may be supported properly.

In another embodiment, the WTRU current QoS category $Q_{UE}$ may be determined by the combination of the data radio bearers QoS on the WTRU (or WTRUs) mapped to the RN DRB. For example, the sum of the $Q_{val}$ values of the active WTRU DRBs may be used in such a way as to consider the RBs with high priority QCIs as well as the number of active DRBs of the WTRU, (i.e., a WTRU with more active DRBs may get a higher QoS category). For example, the WTRU QoS category value $Q_{UE}$ may be determined as follows:

$$Q_{UE}=(Q_{val-1}+Q_{val-2}+\ldots+Q_{val-m}+\text{def}Q_{val-m+1}\ldots+\text{def}Q_{val-w})/w; \quad \text{Equation (1)}$$

where $Q_{val-1}$, $Q_{val-2}$ ... $Q_{val-m}$ are the normalized/converted $Q_{val}$ values of the in active DRBs, w is the maximum number of allowed WTRU DRBs, (e.g., 8), and def$Q_{val}$ are for the remaining inactive DRBs among the in maximum WTRU DRBs, in which the def$Q_{val}$ value equals to the maximum $Q_{val}$ value normalized/converted from the QCI-table, (e.g., 9). For example, a WTRU with two active DRBs of $Q_{val}$ values 2 and 3 may have a lower WTRU QoS category value than another WTRU with three active DRBs of $Q_{val}$ values 2, 3 and 4, while a WTRU with two active DRBs of $Q_{val}$ values 2 and 3 may have a higher WTRU QoS category value than a WTRU with two active DRBs of $Q_{val}$ values 3 and 4, and so on. The resulting $Q_{UE}$ may require some rounding and mapping (e.g., to a set of ranges) to obtain a reasonable set of groups for per-WTRU based reporting-WTRU-grouping.

In another embodiment, the WTRU current QoS category $Q_{UE}$ may be determined by a weighted Qval combination on the WTRU. A different scaling factor may be applied to the Qval values in Equation (1) according to their priority so that the higher prioritized Qval values may be counted more in combination. For example, the WTRU QoS category value $Q_{UE}$ may be determined as follows:

$$Q_{UE}=(u_1 Q_{val-1}+u_2 Q_{val-2}+\ldots+u_m Q_{val-m}+u_w\text{def}Q_{val-m+1}+\ldots+u_w\text{def}Q_{val-w})/w; \quad \text{Equation (2)}$$

where $Q_{val-1}$, $Q_{val-2}$, ..., $Q_{val-m}$ are the normalized/converted $Q_{val}$ values of the m active DRBs, and $u_1$, $u_2$, ..., $u_m$ are the scaling factors on the $Q_{val}$ values.

The scaling factors, $u_x$, may be pre-determined by definition, (for example, $u_x$=[1.0, 1.1, 1.2. 1.3 ..., 1.9, 2.0]). Alternatively, the scaling factors may be determined by a default rule such that the lower the $Q_{val}$ value, the smaller the $u_x$ value, (e.g., for the $Q_{val}$ values assigned to GBR data radio bearers the $u_x$ may be 1.0, while for the $Q_{val}$ values assigned for non-GBR data radio bearers the $u_x$ may be 1.3). Alternatively, the scaling factors may be determined by the network.

Alternatively, $Q_{UE}$ in Equation (2) may be normalized taking into account the scale factors $u_x(s)$ as follows:

$$Q_{UE}=(u_1 Q_{val-1}+u_2 Q_{val-2}+\ldots+u_m Q_{val-m}+u_w\text{def}Q_{val-m+1}+\ldots+u_w\text{def}Q_{val-w})/U; \quad \text{Equation (3)}$$

where U=sum ($u_1$, $u_2$, ... $u_m$). The resulting $Q_{UE}$ may require some rounding and mapping, (e.g., to a set of ranges), to obtain a reasonable set of groups for per-WTRU based reporting-WTRU-grouping.

In this embodiment, (by assigning different weights to the WTRU DRBs), a controlled balance may be achieved on the final outcome of the WTRU QoS category $Q_{UE}$ in RN BSR between the highest prioritized Qval and the number of active DRBs in the WTRU, while not totally sacrificing the WTRUs with few higher prioritized $Q_{val}$s.

In another embodiment, the WTRU current QoS category $Q_{UE}$ may be determined by the current aggregated prioritized bit rate (PBR) of active DRBs on the WTRU. The larger the aggregated bit rate, the higher the WTRU QoS category value, in terms of using the WTRU QoS category for the reporting-WTRU-group assignment. An example of the aggregated bit rate is to sum up the PBRs for the WTRU active DRBs.

When the RN BSR is triggered, the RN may sum the available data in buffers (uplink or uplink+downlink) assigned to a reporting-WTRU-group (or each of multiple reporting-WTRU-groups) and format the BSR record with the assigned reporting-WTRU-group-ID(s) and the total data buffered (for the one group or each group) in actual or converted size indication. The converted size indication may be a value (such as an index into a look-up table) representing the buffer size or range in which the buffer size falls.

WTRU control plane traffic that does not terminate in the RN may be grouped as one reporting group. Several control plane bearers may exist over the Un for control signaling between the DeNB and the RN. These control channels at least include the S1-AP from the MME/serving gateway (S-GW), the X2-AP to each of the potential target eNBs and the RRC protocol between the DeNB and the RN. These channels may be grouped together as one RN SRB or as multiple RN SRBs. In either case, they may be grouped into one reporting group for buffer status reporting and other reporting.

In case the RN DRBs are organized per-RN, one DRB is configured. In this case, in addition to a sum report of the entire accumulated data in the RN, some of its component streams or sub-data streams (corresponding to a WTRU DRB or to some other aggregation scheme) may be grouped for BSR reporting purposes for better reporting granularity.

The report may be configured for the RN as a general configuration or may be individually configured or ordered by the DeNB for the sub-streams of the per-RN DRB configuration. The BSR reporting group may be organized per-WTRU or per-WTRU group(s). In this case, one or more WTRUs individual buffer status, or the sum of one or more reporting-WTRU-groups may be reported. The grouping may be performed in a similar way disclosed above. The BSR reporting group may be organized per QoS or per-QoS group(s). In this case, individual or aggregated data buffer accumulation status of one or more QoS or QoS groups may be reported. The grouping may be performed in a similar way disclosed above.

Embodiments for triggering RN BSR reporting are disclosed hereafter. It may be noted that the embodiments may be used independently, together, or as a sub-part of another embodiment. The embodiments for triggering the RN BSR may be applied to any types of RN BSRs disclosed above.

In one embodiment, the RN may be configured with a triggering event such that the RN BSR is generated and sent by the RN when a specific event occurs. Such triggering events include, but are not limited to, buffer accumulation going above a threshold, buffer accumulation going below a threshold, an expiration of a timer which may be restarted due to other triggers, (such as a command from the DeNB or buffer accumulation going above or below a threshold), etc.

In another embodiment, the DeNB may specifically trigger an RN for an RN BSR. For example, in case where the configured BSR triggering does not happen often enough or the DeNB needs some immediate BSRs before reconfiguring a cell, the DeNB may trigger a BSR for a specific RN(s). When the DeNB triggers the RN BSR report, the DeNB may specify the required status types in the report, (e.g., whether the report may include an uplink BSR, a downlink BSR, or both, or the WTRU BSRs or a satisfaction indicator, or a combination of these), and/or the reporting groups such as which DRB group (per-WTRU or per QoS), which SRB group, or a combination of them. The response from the RN may be sent via an RRC message or an MAC message.

In another embodiment, the RN may be configured with a periodic timer to send BSR reports periodically such that the RN BSR is generated and sent regardless of the amount of data in the buffers of concern when the periodic timer expires. The periodic RN BSR reporting may be activated if a special flag indicates to do so, (such as a periodic reporting flag provided to the RN in a message from the DeNB). The RN may send the periodic BSR reports if no threshold-related parameters are configured for event-triggered reporting. If no specific period is provided, a default value may be used.

In another embodiment, event triggering may be configured in conjunction with a periodic timer. For example, thresholds related to the buffer accumulation volume, (e.g., the byte count or byte count range), may be used in conjunction with the periodic timer. The thresholds may be a low buffer accumulation mark and/or a high buffer accumulation mark. The buffer accumulation count may be considered normal when it is between the low mark and the high mark. If the buffer accumulation is below the low mark, it may mean that the RN load is somehow reduced or deflated. On the other hand, if the buffer accumulation count is above the high mark, it may mean that either the link condition is poor or the resources allocated for transmitting the load is not enough.

FIG. 5 is a flow diagram of an example process 500 of combined event-triggered and periodic BSR reporting in one embodiment. In this embodiment, the RN reports a BSR(s) based on buffer accumulation, (i.e., based on comparison to one or more thresholds (e.g., a low mark and/or a high mark). When one or more of the thresholds is crossed, RN reports BSR periodically based on the configured periodic timer. When the buffer accumulation is normal, (e.g., between the low and high marks), for one or more reporting periods for the RN, the RN may stop sending the periodic reports. Each report may be for one or more RN-DRBs or for one or more reporting groups, or for one or more WTRU RBs based on configuration and/or buffer accumulation.

When a periodic timer expires (502), the RN evaluates the buffer accumulation status (all, or one or more specifically configured, or a default set), (e.g., using one or more pre-configured buffer accumulation marks) (504). The periodic timer is initially set to an originally configured value. If it is determined that the buffer accumulation is normal, (i.e., between a low mark and a high mark), at this period, the RN further determines whether the buffer accumulation status changed normal at this period, (or alternatively the buffer accumulation status has remained normal for a recent predetermined number of periods (m)) (506).

If the buffer accumulation status changed normal at this period (or alternatively, the buffer status has remained normal for the recent m periods), the RN reports a BSR (508). If the buffer accumulation status did not change normal at this period (or alternatively the buffer accumulation status has remained normal for more than recent m periods), the RN may not report a BSR, and the RN may reset the periodic timer to N times the originally configured value, and the process 500 returns to step 502 to wait for expiration of the periodic timer.

If the buffer accumulation is below the low-mark, the RN reports a BSR (510). The RN may report a BSR for the reporting group or the RN DRB that triggers the BSR. Alternatively, the RN may report a BSR for a default reporting group(s) or RN DRB(s) in addition to a BSR for the triggering RN DRB or reporting-group. The RN may reset the periodic timer to the originally configured value if it has changed (512), and the process returns to step 502.

If the buffer accumulation is above the high-mark, the RN reports a BSR (514). The RN may report a BSR for the reporting group or the RN DRB that triggers the BSR. Alternatively, the RN may report BSRs for either triggered ones, triggered ones plus default ones, or all BSRs. The RN may reset the periodic timer to the originally configured value if it has changed (516).

At the next expiration of the periodic timer, the RN evaluates the buffer accumulation status (all, or one or more specifically configured, or a default set) (518). If it is determined at step 520 that the buffer accumulation stays above the high mark, the RN reports BSRs for either triggered ones, triggered ones plus default ones, or all BSRs (522), and the process 500 returns to step 518.

If it is determined at step 520 that the buffer accumulation is not above the high mark, the RN may report a BSR(s), (e.g., the previous one triggered by going above the high mark, a new BSR triggered by going below the low mark, a default one(s), all, etc.) (524), and the process returns to step 502, (or alternatively to step 518 if the buffer accumulation has been below the high mark for a predetermined time(s), which may be defined by the standards or configured by the DeNB or any network entity, otherwise to step 502).

The thresholds (e.g., high mark and/or low mark) to use for event triggered reporting or the combined periodic and event triggered reporting may be fixed. Alternatively, the thresholds may be semi-statically configured by the network. Alternatively, the thresholds may be computed by the RN, for example dynamically corresponding to the ups and downs of the aggregated throughput value of the BSR reporting unit. For example, the thresholds may be related to the aggregated GBR or AMBR, when applicable, from each of the component radio bearers of the basic BSR reporting unit, or the sum of the bucket sizes (obtained by multiplying the prioritized bit rate with the buffer size duration) of its component radio bearers of the basic BSR reporting unit.

A time-to-trigger value may be configured for the RN BSR reporting such that a BSR is triggered when a threshold is crossed and maintained for a time period equal to or longer than the time-to-trigger value.

In one embodiment, an RN BSR may be piggybacked in the MAC PDU if there is an available space in the MAC PDU. A periodic timer may be employed to trigger the piggybacked RN BSR generation. The piggybacked RN BSR may be triggered based on the availability of a MAC PDU unfilled space of at least certain predetermined size. The predetermined size may be defined to hold a certain minimal RN BSR or several of a category or a combination of RN BSRs and other relevant traffic information, such as the uplink RN SRB report, or the high priority uplink BSR or the uplink BSR plus downlink BSR, etc.

The piggybacked RN BSR may have a buffer accumulation threshold value so that the BSR is generated, for example, when the buffer accumulation is below a low mark and/or above a high mark. The thresholds may have values more lenient for generating the piggybacked RN BSR, (i.e., the piggybacked BSR triggering thresholds have a higher low mark and a lower high mark by an offset (which may be a default value in the standards or signaled by the DeNB or network entity) from the ones disclosed above).

The piggybacked RN BSR triggering time may be close to the next periodic timer occasion as follows:

$$\text{trigger time} \geq \text{previous\_report\_time} + (\text{periodic\_timer\_value})/2; \quad \text{Equation (4)}$$

$$\text{trigger time} \geq (\text{previous\_report\_time} + \text{periodic\_timer\_value}) - T_{\textit{offset}}; \quad \text{Equation (5)}$$

where Toffset may be a default value defined in the standards or signaled by the DeNB or any network entity.

A piggybacked RN BSR may be generated if there is space and the timing is right, or if there is space and the threshold event is triggered, or if there is space and the timer is expired not long ago a predefined tolerance value. The periodic timer may restart if a piggybacked RN BSR is transmitted. If the timer expires and there is no piggyback space, the RN may wait until there is a grant or subframe resource available for a full RN BSR or start an uplink grant request action (to be defined for RN).

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A wireless device comprising:
   a transceiver; and
   a processor operatively coupled to the transceiver; wherein:
   the processor is configured to generate a first buffer status report (BSR) associated with first data for transmission to at least one wireless transmit/receive unit (WTRU);
   the processor is configured to generate a second BSR associated with second data for transmission to a base station;
   the transceiver is configured to transmit the first BSR and the second BSR in a medium access control (MAC) protocol data unit (PDU) to the base station;
   the transceiver is configured to transmit the first data to the at least one WTRU; and
   the transceiver is configured to transmit the second data to the base station.

2. The wireless device of claim 1, wherein generating the first BSR and generating the second BSR are based on a priority associated with the first BSR and a priority associated with the second BSR.

3. The wireless device of claim 2, wherein the priority associated with the first BSR is a high priority.

4. The wireless device of claim 2, wherein the priority associated with the second BSR is a high priority.

5. The wireless device of claim 2, wherein the priority associated with the first BSR is associated with a logical channel group.

6. The wireless device of claim 2, wherein the priority associated with the second BSR is associated with a logical channel group.

7. The wireless device of claim 2, wherein the first data is transmitted based on the priority associated with the first BSR.

8. The wireless device of claim 2, wherein the second data is transmitted based on the priority associated with the second BSR.

9. The wireless device of claim 1, wherein the first BSR further includes a plurality of indexes.

10. A method for use in a wireless device, the method comprising:
    generating a first buffer status report (BSR) associated with first data for transmission to at least one wireless transmit/receive unit (WTRU);
    generating a second BSR associated with second data for transmission to a base station;
    transmitting the first BSR and the second BSR in a medium access control (MAC) protocol data unit (PDU) to the base station;
    transmitting the first data to the at least one WTRU; and
    transmitting the second data to the base station.

11. The method of claim 10, wherein generating the first BSR and generating he second BSR are based on a priority associated with the first BSR and a priority associated with the second BSR.

12. The method of claim 11, wherein the priority associated with the first BSR is a high priority.

13. The method of claim 11, wherein the priority associated with the second BSR is a high priority.

14. The method of claim 11, wherein the priority associated with the first BSR is associated with a logical channel group.

15. The method of claim 11, wherein the priority associated with the second BSR is associated with a logical channel group.

16. The method of claim 11, wherein the first data is transmitted based on the priority associated with the first BSR.

17. The method of claim 11, wherein the second data is transmitted based on the priority associated with the second BSR.

18. The method of claim 10, wherein the first BSR further includes a plurality of indexes.

19. A base station comprising:
a transceiver; and
a processor operatively coupled to the transceiver;
wherein:
 the transceiver is configured to receive., from a wireless device., a medium access control (MAC) protocol data unit (PDU) including a first buffer status report (BSR) and a second BSR, wherein the first buffer status report (BSR) is associated with first data for transmission to at least one wireless transmit/receive unit (WTRU) and the second BSR is associated with second data for transmission to the base station;
 the transceiver and the processor are configured to schedule, for transmission by the wireless device in response to the received first BSR, at least one of:
 (i) the first data, or
 the second data; and
 the transceiver is configured to receive the second data from the wireless device.

20. The base station of claim 19, wherein the first BSR further includes a plurality of indexes.

* * * * *